US008328107B2

(12) United States Patent
Meilland et al.

(10) Patent No.: US 8,328,107 B2
(45) Date of Patent: Dec. 11, 2012

(54) HIGH TEMPERATURE TAG

(75) Inventors: Andre Meilland, Romont (CH); Eric Suligoj, Epalinges (CH)

(73) Assignee: Assa Abloy AB (SE)

( * ) Notice: Subject to any disclaimer, the term of this patent is extended or adjusted under 35 U.S.C. 154(b) by 0 days.

(21) Appl. No.: 13/007,402

(22) Filed: Jan. 14, 2011

(65) Prior Publication Data

US 2011/0226856 A1      Sep. 22, 2011

(30) Foreign Application Priority Data

Jan. 15, 2010   (CH) .......................................... 49/10

(51) Int. Cl.
G06K 19/06          (2006.01)
(52) U.S. Cl. ....................................... 235/492; 235/488
(58) Field of Classification Search .................. 235/488, 235/492
See application file for complete search history.

(56) References Cited

U.S. PATENT DOCUMENTS

| 5,973,599 | A  |   | 10/1999 | Nicholson et al. |         |
|-----------|----|---|---------|------------------|---------|
| 6,255,949 | B1 | * | 7/2001  | Nicholson et al. | 340/572.8 |
| 6,957,777 | B1 |   | 10/2005 | Huang            |         |
| 2006/0109118 | A1 |   | 5/2006 | Pelo et al.      |         |
| 2007/0105616 | A1 |   | 5/2007 | Chapet et al.    |         |

FOREIGN PATENT DOCUMENTS

| DE | 4205216 A1 | 8/1992 |
| EP | 0564927 A1 | 10/1993 |
| EP | 18848888 | 2/2008 |
| WO | WO 98/45806 | 10/1998 |
| WO | WO 99/19851 | 4/1999 |
| WO | WO 2007/090026 A1 | 8/2007 |

OTHER PUBLICATIONS

Search Report and Opinion for European Patent Application No. 11150439.5, dated May 20, 2011, 6 pages.

* cited by examiner

*Primary Examiner* — Kristy A Haupt
(74) *Attorney, Agent, or Firm* — Sheridan Ross P.C.

(57) ABSTRACT

In the high temperature tag of the disclosure, a transponder is placed between at least two thin layers of compressible high temperature material, preferably a high temperature textile. This resulting sandwich is then placed in the closed chamber formed by a two-part-housing of high temperature plastic. Finally, a cover, also of high temperature plastic, is injection-molded over the joining parts of the housing, in order to seal it hermetically.

8 Claims, 2 Drawing Sheets

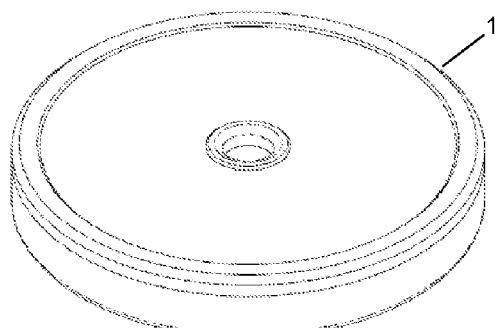
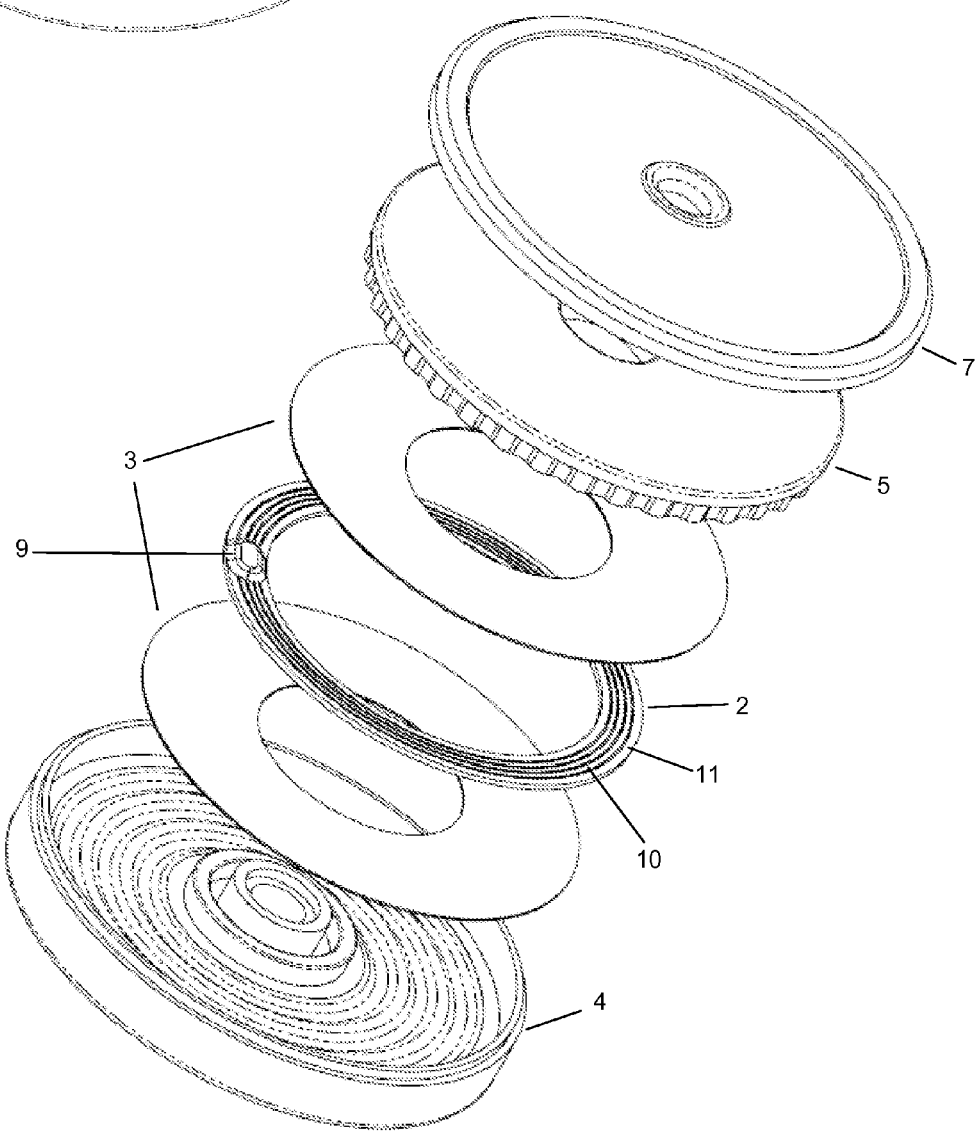

HIGH TEMPERATURE TAG

FIELD OF THE DISCLOSURE

The present disclosure relates to radio frequency identification (RFID) devices, and more specifically to high temperature RFID tags.

STATE OF THE ART

Transponders are well known in the art and generally comprise an electrical circuit having an antenna connected to an integrated circuit. The transponder is responsive to a received radio frequency signal and produces a radio frequency signal.

Beside the connection of the two electric elements of the electrical circuit, a key step of the manufacture of a transponder is the encapsulation of said electrical circuit in order to protect it from mechanical shocks, from soiling, fluids, heat, . . . to ensure a durable mechanical connection between the two elements and to provide a size that allows for better handling.

To ensure perfect functionality of the transponder, the packaging has to be totally adapted to the nature of the final application and to the specifications defined by the user. The final product can be—but is not limited to—a glass mini-tube, a plastic coin token or a contactless smart card. Due to the popularity of the RFID technology in an increasing number of fields of activity, there are more and more demands for special types of packaging.

It is therefore an object of the present disclosure to provide an RFID tag with a high resistance to temperature variations and, more specifically, the capacity to operate in harsh, high temperature factory environments.

A preferred application area for such tags is the automotive industry and, more particularly, the marking of vehicle parts to be painted, where ovens are commonly used to bake the paint with different thermal cycling up to 210° C. It also has to be noted that for this particular application, silicone compounds are not allowed for any element of the tag, as the painting process itself is extremely sensitive to silicon contamination. Different RFID tag solutions for this specific application are disclosed for example in DE4205216, WO9845806 and EP0564927. All these known tags comprise an electronic transponder sealed into a multiple layers casing, with the common feature of being cumbersome and having a form which no longer meets today's industry standards and requirements.

U.S. Pat. No. 5,973,599 proposes a compact disc tag design meeting such standards. The transponder itself is made of a high temperature PCB (as a polyimide or ceramic compound) and is encapsulated in high temperature epoxy. The transponder is then placed in a housing base made of thermally resistant plastic such as Teflon® or Ryton® PPS (polyphenylenesulfide). Then a top housing (of a similar material) is injection-molded onto the housing base, encapsulating the transponder therein. A problem of this known tag is that each component of this very compact tag has a different dilatation coefficient, which can result in major stress and damage when submitted to multiple thermal cycles.

SUMMARY

It is therefore an aim of the present disclosure to propose an improved high temperature tag.

A further aim of the present disclosure is to propose a tag construction resulting in a high temperature tag with a small form and a low production price.

An idea of the disclosure is to place the transponder between at least two thin layers of compressible high temperature material, preferably a high temperature textile, in a "sandwich-like" configuration. This resulting "sandwich" layer is then placed in a closed chamber formed by a two-part-housing of high temperature plastic. Finally, a cover also of high temperature plastic is injection-molded over the joining parts of the housing, in order to seal it hermetically.

A feature of the disclosure is that the dimension and the internal profile of the closed chamber formed by the housing in which the transponder and the compressible high temperature material are placed are selected so that said chamber squeezes at least punctually the compressible material layers. This results in maintaining the transponder in a floating position inside the "sandwich" layer, but without any mechanical pressure being directly exerted on it with the parts of the housing. The volume of the chamber has to be calculated so that even the most compressed portions of the compressible material layers still show enough residual compressibility/deformation capability to absorb any difference of dilatation between the housing and the transponder during defined high temperature cycles.

As mentioned above, in a preferred embodiment of the disclosure, the layers of compressible high temperature material are made of high temperature textile. Such material shows a very interesting thermal insulation coefficient, even when using quite thin layers, in combination with a high compressibility, due to the presence of a lot of air between the fibers.

In another preferred embodiment of the disclosure, the two parts of the housing and the overmolded cover are made of one or of a plurality of the following high temperature plastics: PPS (polyphenylenesulfide), PPA (polyphthalamide) or PEEK (polyetheretherketone).

According to a particular embodiment of the disclosure, the transponder used comprises a high temperature PCB (Printed Circuit Board) on which an antenna and a RFID integrated circuit (IC) are fixed and electrically bonded together. Preferably, both top surfaces of the antenna terminal pads and of IC connection pads are made of gold or covered with gold, and are electrically connected together by a gold wire. The advantage is that this pure gold/gold connection is not subjected to any inter-metallic reaction at high temperatures.

BRIEF DESCRIPTION OF THE DRAWINGS

The disclosure will be better understood in the text below together with the following drawings:

FIG. 1 shows a perspective view of a high temperature tag according the present disclosure;

FIG. 2 shows an exploded view of the tag of FIG. 1;

DETAILED DESCRIPTION

Figure 3:
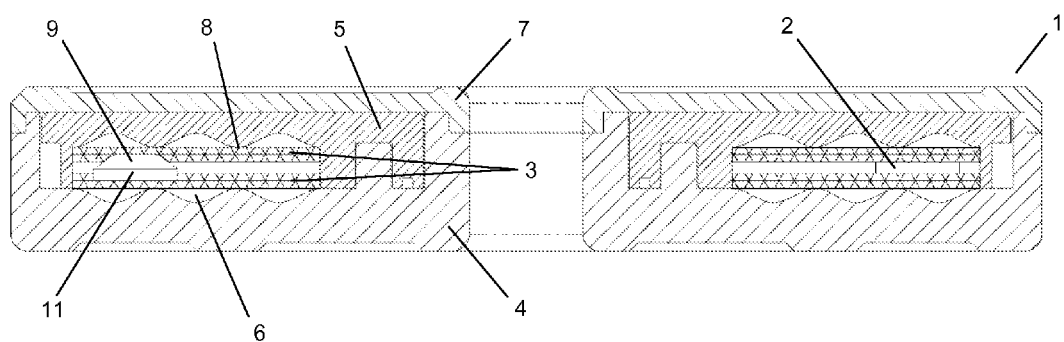
FIG. 3 shows a schematic cross section view of the tag of FIG. 1.

FIG. 1 shows a perspective schematic view of a tag 1 according to the disclosure. In this example, the tag has a disk shape, with a diameter in the range of about 6 cm and a thickness of 0.75 cm. It is capable of being attached to or embedded in various surface configurations and a limited surface area. The disk features a hole in its center. This hole is optional, but aims to facilitate handling and fixation of the tag, reinforcing its mechanical structure and easing some manufacturing steps (see injection-molding below). Naturally, this example is not limitative, and the high temperature tag according the disclosure can have various shapes, sizes and also include various conventional attachment means. The choice of these parameters will depend on different factors, including, in particular, the size and shape of the transponder 2 packaged in tag 1 and/or the size and the shape of the defined surface of fixation of the object to be tagged.

As illustrated in the exploded view of FIG. 2, the transponder 2 has a ring shape similar to the external form of the tag 1, but with smaller dimensions. In this particular embodiment, the tag comprises a printed circuit board 11 (PCB) on which an antenna 10 and an RFID integrated circuit 9 (IC, here represented embedded in a glob-top or a module structure) are fixed and electrically bonded together. Such a transponder, showing an antenna 10 with a limited number of well separated spires, typically has a working frequency of about 13.56 MHz and is called high frequency (HF: 3-30 MHz) transponder. This example is not limitative and the transponder can also: be low frequency (LF: 20-200 kHz) or ultra high frequency (UHF: over 300 MHz); have varied antenna forms such as loop, dipole, patch, slot, . . . ; or also have different kinds of support (other than the PCB 11) or even be self supporting (without support, wound coil).

A thin layer 3 of compressible high temperature material is positioned on each side of the transponder 2. These layers 3 are preferably made of a high temperature textile such as Zetex 7628. It shows a very interesting thermal insulation coefficient, even when using quite thin layers, in combination with a high compressibility, due to the presence of a lot of air between the fibers.

The resulting sandwich (3,2,3) is encapsulated in the closed chamber formed when the two housing parts 4 and 5 are joined. In this non-limitative embodiment, the housing base 4 has a ring shaped bottom with circumferential walls on the inner and outer edges. The housing top 5 has as corresponding similar ring shape, but with a slightly smaller diameter, so that it can be slid into the housing base 4. Both housing parts 4 and 5 comprise elements such as edges, cap seats, pins, projections, compressions, . . . which aim to work together in order to improve the fixation/positioning of the joined parts 4 and 5, thereby improving the sealing of the closed chamber containing the transponder 2 embedded in the layers 3. In this particular embodiment, the two molded housing parts 4 and 5 were previously realized with PPS Fortron 6165A6.

This results in a provisional housing which is not completely hermetically sealed. The external surface of the resulting housing shows at least a joint line (in this case, two lines, one each for the inner and outer edge) of both housing parts 4 and 5. A disadvantage of such high temperature plastics (i.e. PPS, PPA, PEEK, PTFE, . . . ) is that they are very difficult to weld due to their high temperature and mechanical resistance, in particular with ultrasonic welding. Using high temperature adhesives or seals is not also an ideal solution, as they could contain undesirable chemical compounds (silicone) or have a limited resistance to repetitive temperature cycles (mechanical stress due to differences of dilatation).

In the embodiment illustrated here, a plastic cover 7 is injection-molded over the housing top 5, covering also a small portion of the walls (inner and outer) of the housing base 4. As result, the joining lines of the two housing parts 4 and 5 are entirely covered by the overmolded cover material and are thus hermetically sealed together. Typically, the cover 7 material is made of PPS Fortron 6165A6 and is injected at 360° C./3 seconds. If the two housing parts 4 and 5 are preliminarily joined correctly, the energy impact (temperature and duration) of the injection process is not sufficient to damage the transponder 2 contained in the closed chamber.

The cross section view of FIG. 3 explains how the different elements of the tag 1 are working together. In this particular embodiment, the closed chamber 6 is defined by the joined housing parts 4 and 5 and shows a wave 8 profile with elevations and compressions. It results in the punctuall squeezing of the sandwich insert formed by the compressible layers 3 encapsulating the transponder 2. Here, the elevations are regularly spaced and symmetrically positioned on both housing base 4 and housing top 5. But any regular, irregular, symmetric or asymmetric arrangement is possible, even on fully flat surfaces (exerting a light squeezing pressure on the entire top and bottom surfaces of the sandwich). The profile was also chosen to increase the mechanical resistance of the housing parts against internal and external impacts and pressure (for ex. due to the strong thermal expansion of the gas/air contained in the tag).

The important point is that the force (be it punctual or not) applied by the contact surfaces of the closed chamber 6 on the compressible layers 3 results in maintaining the transponder 2 in a secure position inside the chamber 6. This position is not totally fixed, the transponder 2 is maintained floating between the two layers 3. Note that as in this example, one can use more than one single compressible layer 3 on each side of the transponder, depending on the relative sizes of the elements and of the squeezing effect desired. Under no circumstances is there direct mechanical contact between the housing parts 4 and 5 and the transponder 2. This construction allows a better resistance against mechanical shocks, as mechanical stress cannot be directly transmitted from the housing parts to the transponder. It also allows a better resistance to thermal cycles, as even the most compressed portions of the compressible material layers still show enough residual compressibility/deformation capability to absorb any difference of dilatation between the housing and the transponder during defined high temperature cycles. So the transponder does not suffer any mechanical stress due to a difference dilatation of its packaging. It also increases the thermal insulation as the heat reaching the internal walls of the chamber 6 can only be conducted through the thermal fibers of the layers 3 or by convection through the residual air. As shown in the figure, an irregular (not flat) profile also has the advantage of creating small air spaces where the layers 3 are not in contact with the internal profile 8 of the chamber. This additional residual air also increases the thermal insulation.

One can well recognize in the example of FIG. 3 how the two parts 4 and 5 of the housing are joined together. Grooves match the related elevations, when the profiles fit into the support surfaces. The aim of such a complex structure is to improve the sealing of the chamber 6 and the fixation of the two housing parts 4 and 5 to each other. When the cover 7 is injection-molded on the top of the housing top 5, it will slightly penetrate the joint between the two parts 4 and 5, but cannot flow in far enough to get inside the closed chamber 6. A particular concern here is to avoid any damage of the transponder 3 during the injection-molding process. In the special embodiment illustrated here, the inner and outer walls of the housing base 4 are showing cut edges, so that the injected material is able to flow on the external side of the walls and the cover 7 is better fixed to the housing base 4.

Figure 4:
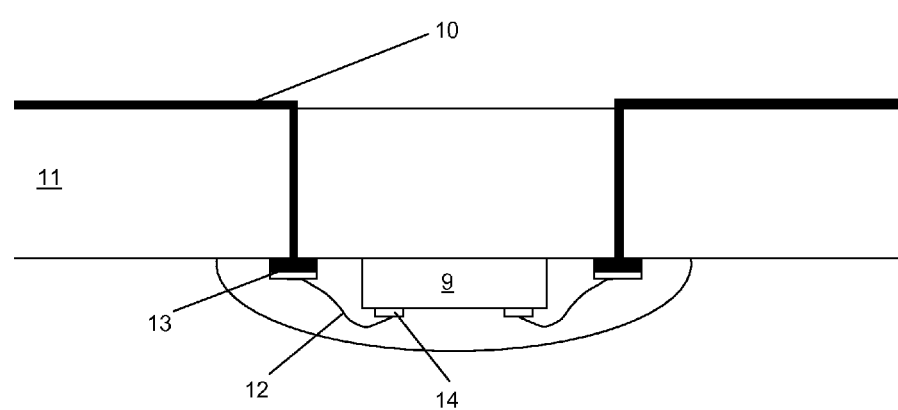
FIG. 4 shows a detailed view of one way to connect the integrated circuit (IC) to the antenna according to one embodiment of the disclosure.

FIG. 4 shows a detailed view of the transponder 2 of FIG. 2 according to one embodiment of the disclosure. The PCB 11 shows an antenna 10 formed/deposited/fixed on by different possible techniques well known in the art. In this example, the antenna is made of copper and is formed by etching on one side of the PCB 11. Antenna terminal pads 13 are formed on the other side of the PCB 11, these terminal pads 13 being electrically connected to the antenna ends through the PCB 11. The aim of this construction is to ease the deposition of a thin gold layer (by galvanic bath) on the top surface of each terminal pad 13. An alternative solution to fix the chip on the same side as the antenna (as shown for example in FIG. 2) would be to cover most of the antenna with a soldering mask and then to cover with gold only the antenna terminals which are kept free. IC 9 is fixed in the proximity of the terminal pads 13 on the same side of the PCB 11. IC 9 shows the connection pads 14 which are in principle made of gold. The electrical connection of the IC 9 to the antenna 10 is ensured by gold wires 12 connecting each antenna terminal pad 13 to IC connection pad 14. The advantage is that this pure gold/gold connection is not subjected to any inter-metallic reaction at high temperatures. Preferably, as shown in the figures, all these elements are then covered with a glob top for protection purposes. Naturally, this example is not limitative, and many other techniques known in the art (flip-chip, direct bonding, . . . ), using one or two surfaces of the PCB or no PCB at all are allowed.

LIST OF NUMERICAL REFERENCES

1 tag
2 transponder
3 high temperature textile
4 housing base
5 housing top
6 closed chamber
7 overmolded cover
8 internal profile
9 integrated circuit (IC)
10 antenna
11 PCB
12 gold wire
13 antenna terminal pad
14 IC connection pad

What is claimed is:

1. A high temperature RFID tag, comprising:
    a transponder;
    at least two layers of compressible high temperature material, one of each said layers being positioned on each side of said transponder;
    a housing base and a housing top, both made of high temperature plastic, which are joined together to form a closed chamber comprising compression means;
    said transponder and said at least two layers being positioned in said closed chamber such that said layers are at least punctually slightly compressed by said compression means, thereby maintaining said transponder in a secure floating position between said at least two layers; and
    an overmolded cover, made of injected high temperature plastic, sealing hermetically the housing base and the housing top together by covering at least the external portions where the base and the top are joined together.

2. A high temperature RFID tag according to claim 1 wherein the layers of compressible high temperature material comprise a high temperature textile.

3. A high temperature RFID tag according to claim 1 wherein each of the housing base, housing top and overmolded cover are made of high temperature plastic materials including one or more of PPS, PPA , PEEK and PTFE.

4. A high temperature RFID tag according to claim 1 wherein said compression means are formed by an internal profile of said closed chamber comprising elevations which are dimensioned and positioned in such a way that they punctually compress said layers, without exerting a direct mechanical pressure on the transponder.

5. A high temperature RFID tag according to claim 4, wherein the compression means are formed in the inner side of the housing base and housing top.

6. A high temperature RFID tag according to claim 4 wherein the antenna shows at least two terminal pads whose top surface is made of gold, wherein the RFID integrated circuit shows at least two connections pads whose top surface is made of gold, and wherein each terminal pad is connected to a connection pad by means of a gold wire.

7. A high temperature RFID tag according to claim 1 wherein the transponder comprises a high temperature PCB on which an antenna and a RFID integrated circuit are fixed and bonded together.

8. A high temperature RFID tag according to claim 1, wherein none of the components of the tag comprise silicon.

* * * * *